(No Model.)
J. G. SANDERSON.
APPARATUS FOR PRODUCING GAS.
No. 596,428. Patented Dec. 28, 1897.
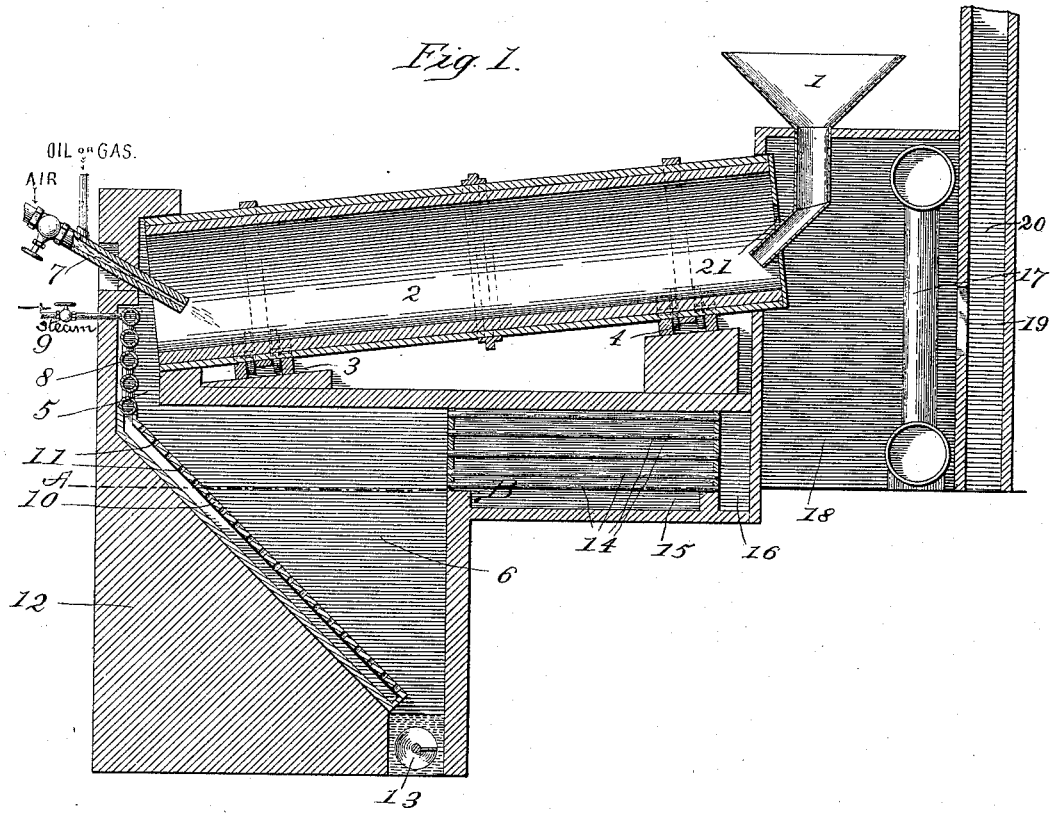
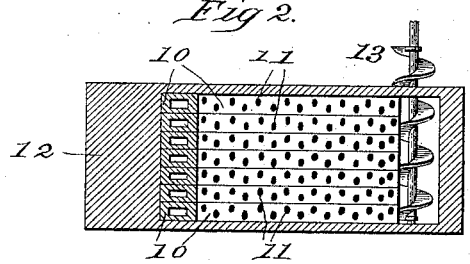
Witnesses:
Harry B. Pohrer
Geo. E. Cruse
Inventor:
James Gardner Sanderson.
By Knight Bros.
Attys.

UNITED STATES PATENT OFFICE.

JAMES GARDNER SANDERSON, OF SCRANTON, PENNSYLVANIA.

APPARATUS FOR PRODUCING GAS.

SPECIFICATION forming part of Letters Patent No. 596,428, dated December 28, 1897.

Application filed October 15, 1894. Serial No. 525,998. (No model.)

*To all whom it may concern:*

Be it known that I, JAMES GARDNER SANDERSON, a citizen of the United States, residing at Scranton, Lackawanna county, and State of Pennsylvania, have invented certain new and useful Improvements in an Apparatus for Producing Gas, of which the following is a specification.

My invention consists in certain apparatus for producing in continuous operation from carbonaceous material and steam a gas which may be used for fuel purposes or carbonized for illuminating purposes by continuously feeding carbonaceous material, such as anthracite coal, past a suitable fire, preferably a fixed flame, so as to drive off the volatile components, including free carbonic acid, ($CO_2$,) and render the residue incandescent, then passing the incandescent purified material into a decomposing-chamber and subjecting it to the action of steam preferably superheated.

My invention further consists in the improved apparatus whereby I am enabled to use waste fuel material, such as an anthracite culm, and facilitate the manufacture, thereby effecting a great saving in the cost of manufacture of the gas.

My improved apparatus consists, broadly, in a suitable feeder, a burner maintaining a constant flame through which the fuel is passed and where it is purified, and a decomposing-chamber having a series of perforated pipes through which steam is introduced. The feeder is made to revolve and in this manner is made to feed the fuel forward toward the burner end thereof, at which point the fuel is raised to an incandescent heat and its volatile constituents driven off. As the incandescent purified carbonaceous material passes on and drops upon the perforated pipes located in the decomposing-chamber the oxygen in the steam escaping therefrom is taken up by the incandescent carbon and the hydrogen is set free. The excess of oxygen combines with carbonic acid and makes carbonic oxid, which is itself freely combustible, and mixing with the aforesaid hydrogen produces a gas possessing high caloric properties, and this is conveyed away to any suitable point for use.

My invention further consists of novel details of construction, which will hereinafter be referred to, and specifically pointed out in the claims.

In the accompanying drawings, Figure 1 is a vertical section of my improved apparatus; and Fig. 2 is a detail horizontal section taken on the line A B, Fig. 1.

Referring to the drawings, 1 represents the feed-hopper, into which the carboniferous material is fed and by which it is delivered into the feed-cylinder 2, which is revolved in any suitable manner on the rollers 3 4. The cylinder 2 is placed on a slight incline, so that as it is revolved it feeds the fuel forward to the mouth of a passage 5, which leads to the decomposing-chamber 6. As the fuel is fed to this mouth it is raised to an incandescent heat by means of a fire through which it passes and which may be produced by any suitable means.

In the drawings I have shown an injector-burner having the usual fuel and air pipes connected thereto. If desired, the gas generated in the apparatus may be used instead of oil.

8 represents a coil of steam-pipe located in the passage 5 and having a suitable connection 9 with a steam-supply. This coil is connected with a series of pipes 10, located on an inclined bed 12 in the decomposing-chamber 6, and they are provided with perforations 11. It will be seen from the drawings that the heated material at the mouth of the decomposing-chamber 6 is in contact with the coil 8, so that the steam therein is superheated before passing to the decomposing-chamber. The heated fuel drops upon the pipes 10 and passes over them down to the bottom of the decomposing-chamber, at which point a screw conveyer 13 carries it away to any suitable place. The conveyer 13 preferably works in water to prevent any air reaching the decomposing-chamber or gas escaping therefrom.

14 represents a series of pipes located within a cooling-chamber 15, which is in communication with the decomposing-chamber 6. These pipes are adapted to contain water which is heated by the hot gas passing from the decomposing-chamber 6 through the cooling-chamber 15, and the water circulating through these pipes is heated and may be conveyed to a steam-generator and then to the coil 8, where it is superheated.

16 represents a passage in open communication with the chamber 15 for conducting the gas to a receiver or directly to the point of consumption, and to insure the flow of the gas in the direction indicated an exhaust-fan or an exhaust-receiver or other appliance may be used.

17 represents a radiator located in a chamber 18, which has communication with the revolving cylinder through an opening 21 and with the smoke-flue 20 through an opening 19. The object in locating the radiator 17 in the chamber 18 is to heat the air contained therein for use in the burner 7. This is accomplished by the products of combustion which pass through the cylinder 2 into the chamber 18 and out through the flue 20.

The operation of my apparatus is as follows: The carbonaceous material is continuously fed into the cylinder 2 through the hopper 1, and as the former is revolved the fuel is passed to the passage 5, at which point the burner raises the material to an incandescent heat and drives off the volatile components, which would be impurities in my process. The passage 5 is always filled with heated fuel in order that the decomposing-chamber shall be isolated and no gas shall pass out of the same through the cylinder. This also insures the escape of the undesirable gases upward and a preliminary heating of the incoming fuel. After the fuel has been heated to incandescence and purified and drops upon the pipes 10 the steam is turned on, and as the steam passes out through the perforations 11 it is decomposed by contact with the incandescent material, hydrogen being set free and oxygen being taken up and forming carbonic oxid, which mixes with the hydrogen. This resultant gas is conveyed away to tanks. If the gas is only to be used for fuel purposes, it may be conveyed away to the point of consumption; but if it is to be used for illuminating purposes it should be carbureted in the usual manner and passed through a "condenser," "cooler," &c.

From the above it will be seen that I have produced a method of and apparatus for continuously producing a water-gas in the most expeditious and cheapest manner possible.

I prefer to employ anthracite fuel because of its superior quality, and by my improved construction I am enabled to employ the culm of this material, which reduces the cost of the process very materially. I also prefer to employ a burner-flame for doing the heating, as this insures uniformity of heating effect.

Having thus described my invention, the following is what I claim as new therein and desire to secure by Letters Patent—

1. An apparatus for producing water-gas in continuous operation consisting of a coal-feeding device, a decomposing-chamber, a passage leading from the feeding device to the decomposing-chamber, a fire located in said passage with which the coal is brought into direct contact for bringing it to incandescence before reaching the decomposing-chamber, and means for directing steam on the incandescent material in the decomposing-chamber, as explained.

2. In an apparatus for producing gas, the combination of a suitable decomposing-chamber, a rotary cylinder adapted to feed carboniferous fuel to a passage from the furnace, a burner for heating the fuel to an incandescent heat, and a series of steam-pipes in open communication with the decomposing-chamber, substantially as set forth.

3. In an apparatus for producing gas, the combination of a decomposing-chamber having a passage leading thereto, a rotary cylinder feeding carboniferous fuel to said passage, a burner adapted to heat the fuel to an incandescent heat before it enters the decomposing-chamber, and a series of steam-pipes in open communication with the decomposing-chamber and with which the heated material comes in contact, substantially as and for the purpose set forth.

4. In an apparatus for producing gas, the combination of a decomposing-chamber having a passage leading thereto, a series of perforated steam-pipes located within said chamber, a rotary cylinder for feeding carboniferous fuel to the said passage, and a burner for heating the fuel before it enters the decomposing-chamber, substantially as shown and described.

5. In an apparatus for producing gas, the combination of a decomposing-chamber having a passage leading thereto, a series of perforated pipes located within the decomposing-chamber, a rotary cylinder adapted to supply carboniferous material to the said passage, a burner for heating the fuel to an incandescent heat before it enters the decomposing-chamber and a conveyer located in the decomposing-chamber, substantially as and for the purpose set forth.

6. In an apparatus for producing water-gas, the combination of a decomposing-chamber having a passage leading thereto, a series of perforated pipes located within said chamber through which steam passes, a rotary cylinder for feeding carboniferous material to the said passage, a burner for heating the fuel to an incandescent heat before it enters the decomposing-chamber, and a conveyer located at the bottom of the decomposing-chamber and working in water, substantially as and for the purpose set forth.

7. In an apparatus for producing water-gas, the combination of a decomposing-chamber, a rotary cylinder for feeding fuel to the decomposing-chamber, a burner for heating the fuel to an incandescent heat, perforated steam-pipes located in the said decomposing-chamber; a passage for conveying away the products of combustion, and an air-heater located in said passage, a passage for conveying away the gas from the decomposing-chamber and pipes for containing water located in said passage; substantially as and for the purpose set forth.

JAMES GARDNER SANDERSON.

Witnesses:
E. McB. SANDERSON,
J. ATTICUS ROBERTSON.